United States Patent
Sakuma

(10) Patent No.: US 8,468,883 B2
(45) Date of Patent: Jun. 25, 2013

(54) THERMAL TYPE FLOW SENSOR HAVING A HUMIDITY DETECTION PORTION AND AN AIR FLOW DETECTING PORTION

(75) Inventor: Noriyuki Sakuma, Kodaira (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 412 days.

(21) Appl. No.: 12/901,101

(22) Filed: Oct. 8, 2010

(65) Prior Publication Data

US 2011/0107832 A1    May 12, 2011

(30) Foreign Application Priority Data

Nov. 6, 2009    (JP) ................................. 2009-254621

(51) Int. Cl.
*G01F 1/68* (2006.01)
(52) U.S. Cl.
USPC ...................... 73/204.26; 73/24.04; 73/29.01
(58) Field of Classification Search
None
See application file for complete search history.

(56) References Cited

U.S. PATENT DOCUMENTS

| 4,966,037 A | * | 10/1990 | Sumner et al. | ............. 73/204.26 |
| 5,551,283 A | | 9/1996 | Manaka et al. | |
| 5,852,238 A | * | 12/1998 | Vaitkus | ...................... 73/204.11 |
| 2007/0113644 A1 | * | 5/2007 | Manaka et al. | ............. 73/204.26 |
| 2010/0139391 A1 | | 6/2010 | Sakuma | |

FOREIGN PATENT DOCUMENTS

| JP | 60-142268 A | 7/1985 |
| JP | 7-55748 A | 3/1995 |
| JP | 7-229776 A | 8/1995 |
| JP | 10-197305 A | 7/1998 |
| JP | 2010-133897 A | 6/2010 |

* cited by examiner

*Primary Examiner* — Harshad R Patel
(74) *Attorney, Agent, or Firm* — Crowell & Moring LLP

(57) ABSTRACT

A thermal type fluid flow sensor includes an air flow detecting portion and a temperature detecting portion formed above the same substrate, capable of correcting a humidity, and having a high measuring accuracy at a low cost, and a heat generating resistor, a temperature measuring resistor for the heat detecting resistor, a temperature measuring resistor for detecting an air flow, and a heat generating resistor for detecting a humidity are arranged in a diaphragm formed above a semiconductor substrate, an air cavity layer, and a protecting film above the air cavity layer are formed above the heat generating resistor for detecting the humidity, and the protecting film is provided with plural holes reaching the air cavity layer.

15 Claims, 12 Drawing Sheets

3: HEAT GENERATING RESISTOR
4: TEMPERATURE MEASURING RESISTOR FOR HEAT GENERATING RESISTOR
5: TEMPERATURE MEASURING RESISTOR
9: HEAT GENERATING RESISTOR FOR DETECTING HUMIDITY
14: AIR CAVITY LAYER
16: DIAPHRAGM

3: HEAT GENERATING RESISTOR
4: TEMPERATURE MEASURING RESISTOR FOR HEAT GENERATING RESISTOR
5: TEMPERATURE MEASURING RESISTOR
9: HEAT GENERATING RESISTOR FOR DETECTING HUMIDITY
14: AIR CAVITY LAYER
16: DIAPHRAGM

US 8,468,883 B2

THERMAL TYPE FLOW SENSOR HAVING A HUMIDITY DETECTION PORTION AND AN AIR FLOW DETECTING PORTION

CLAIM OF PRIORITY

The present application claims priority from Japanese patent application JP 2009-254621 filed on Nov. 6, 2009, the content of which is hereby incorporated by reference into this application.

FIELD OF THE INVENTION

The present invention relates to a thermal type fluid flow sensor and fabricating method and particularly to a technology which is effectively applied to a thermal type fluid flow meter for measuring intake air of an internal combustion engine as well as a thermal type fluid flow sensor preferable for a thermal type air flow meter, and the fabricating method.

BACKGROUND OF THE INVENTION

At present, as a thermal type fluid flow sensor used in an air flow meter provided at an electronically controlled fuel injection apparatus of an internal combustion engine of an automobile or the like for measuring an intake air amount, a main stream is constituted by thermal type ones since a mass air amount can be directly detected thereby.

Among them, attention is paid particularly to a thermal type air flow sensor fabricated by a semiconductor micromachining technology since the sensor can reduce a fabrication cost and can be driven by a low power. As such an air flow sensor, for example, Japanese Unexamined Patent Publication No. 60 (1985)-142268 (Patent Document 1) discloses a technology of arranging a heat generating resistor and a temperature measuring resistor of measuring an air flow on an air cavity formed by partially anisotropically etching an Si substrate. Further, Japanese Unexamined Patent Publication No. Hei7 (1995)-229776 (Patent Document 2) discloses a thermal type air flow meter in consideration of a correction of an intake air amount by a humidity, and according to a technology disclosed by Patent Document 2 described above, a humidity sensor for detecting a humidity is installed separately from a measuring element for a thermal type air flow meter. In a thermal type air flow sensor disclosed in Japanese Unexamined Patent Publication No. Hei10(1998)-197305 (Patent Document 3), an air flow meter and an element of detecting a relative humidity from a change in an electrostatic capacitance are formed on the same substrate. Further, as a method of measuring a humidity, Japanese Unexamined Patent Publication No. Hei7 (1995)-55748 (Patent Document 4) discloses a technology of detecting a humidity by a change in a resistance value of a heated resistor.

SUMMARY OF THE INVENTION

However, the following problems are posed in the background arts described above. According to the technology disclosed in Patent Document 1, a consideration is not given to an influence by a change in a humidity of intake air effected On the heat generating resistor and the temperature measuring resistor (heat loss) to pose a problem that a detection accuracy of the air flow is deteriorated.

Further, Patent Document 2 discloses a technology of preparing elements of the air flow sensor and the humidity sensor, respectively installing the elements at an intake air path, and correcting an air flow signal based on a humidity signal to output. However, there is needed a design in consideration of an increase in a number of parts and wirings of the elements to each other, and therefore, there poses a problem of increasing a fabrication cost by complicating a structure thereof, and increasing a number of integrating steps.

Further, according to the technology disclosed in Patent Document 3, an increase in a fabrication cost by a number of integrating steps is restrained by arranging the air flow sensor and the humidity sensor on the same element. However, the humidity sensor of measuring a humidity detects the humidity by a change in the electrostatic capacitance, and therefore, not an absolute humidity but a relative humidity is measured. Accordingly, in a case where an air temperature is changed, even when the relative humidity stays the same, an amount of water existing in air differs. Therefore, there is brought about a deviation in correcting an air flow signal by a humidity. Further, a wide area is needed for the humidity sensor of the electrostatic capacitance type for increasing a sensitivity to pose a problem of increasing a fabrication cost by an increase in a size of the element.

Further, although Patent Document 4 discloses the technology of thermally detecting the absolute humidity, there is constituted a structure of covering an element by a sealing cap. When combined with an air flow sensor, a humidity sensor is constituted by an element separate from the air flow sensor. Therefore, there poses a problem of increasing a fabrication cost similar to Patent Document 2. Further, as in Patent Document 3, when the humidity detecting element is arranged on the same element and at a position which is deviated from a region of a flow line of air and is hermetically closed, there poses a problem that an accuracy of the air flow sensor is deteriorated by changing a resistance value of wirings of the air flow sensor by warming up the wirings of the air flow sensor at a vicinity of the humidity detecting element by heat of the humidity detecting element heated for detecting the humidity.

It is an object of the present invention to provide a thermal type fluid flow sensor which can detect an absolute humidity of intake air and increasing an accuracy of detecting an air flow without effecting an influence on an air flow sensor at a low cost.

The above-described and other objects and novel features of the present invention will become apparent from a description of the specification and attached drawings.

A description will simply be given of an outline of a representative feature of the present invention disclosed in the application as follows.

A thermal type fluid flow sensor according to one aspect of the present invention is a thermal type fluid flow sensor formed on a substrate, having a humidity detecting portion and an air flow detecting portion, and measuring an air flow.

The humidity detecting portion includes a first heat generating resistor, an air cavity layer on an upper side of the first heat generating resistor, and a first film formed above the air cavity layer, and the air flow detecting portion includes a second heat generating resistor, and plural temperature measuring resistors provided on a side of the second heat generating resistor to interpose the second heat generating resistor within a face in parallel with a main face of the substrate.

In the thermal type fluid flow sensor according to one aspect of the present invention, the first film includes plural holes reaching the air cavity layer from an upper face of the first film.

A description will simply be given of an advantage achieved by a representative feature of the present invention disclosed in the application as follows.

According to the present invention, in the air flow meter having the humidity detecting portion of a thermal resistor type, there can be provided a highly accurate thermal type fluid flow sensor measuring an absolute humidity and correcting the humidity while restraining an influence by a flow of air.

Further, a detected absolute humidity data can also be utilized for controlling an explosion timing of an engine, and can increase a combustion efficiency.

DETAILED DESCRIPTION OF THE PREFERRED EMBODIMENTS

Figure 1:
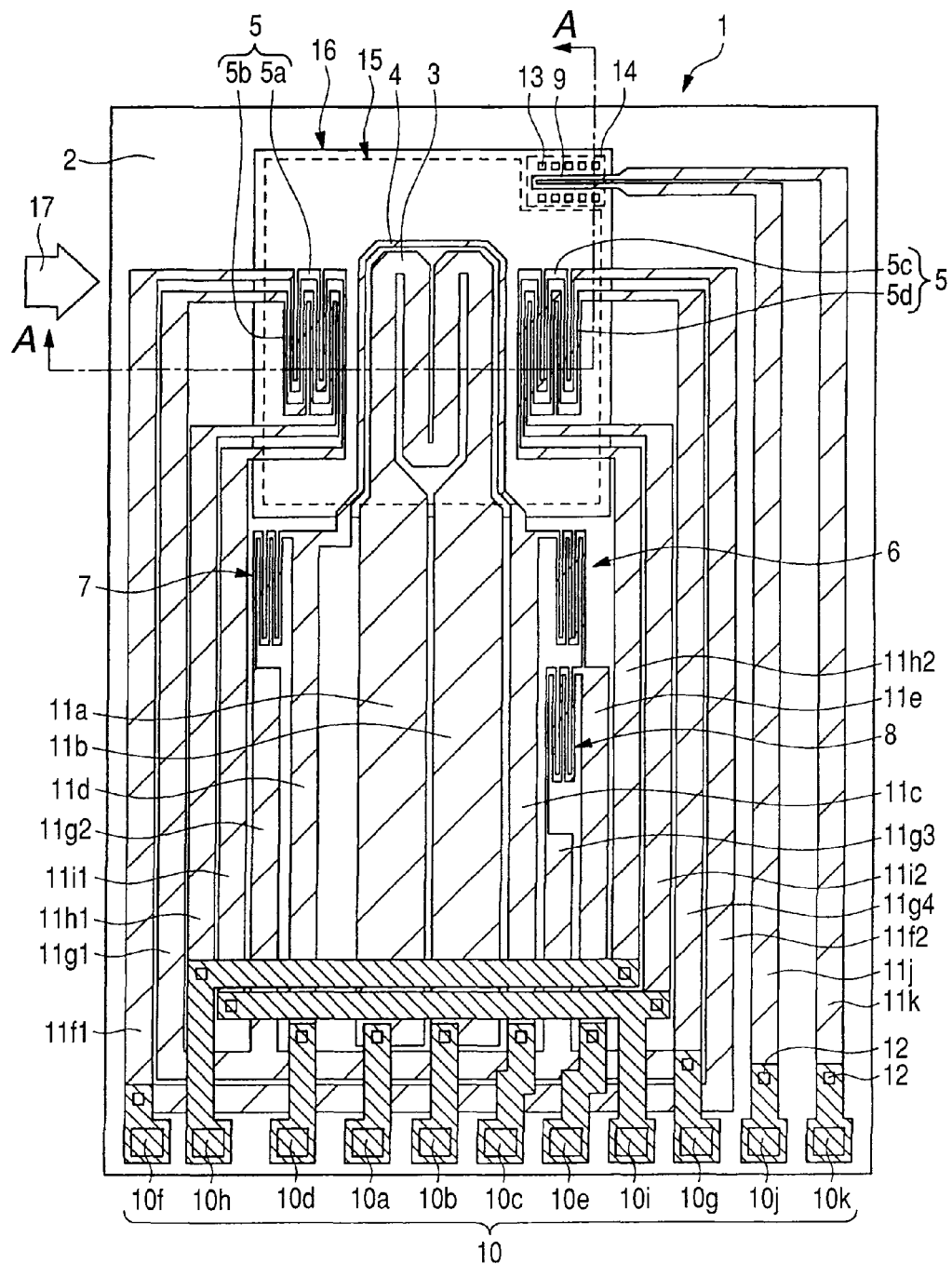
FIG. 1 is a plan view of an essential portion showing an example of a thermal type fluid flow sensor according to a first embodiment of the present invention.

Although a description will be given of an embodiment as follows by dividing the embodiment into plural sections or embodiments when it is necessary for convenience, except a case of being clearly shown particularly, these are not unrelated to each other but one thereof is brought into a relationship of being a modification, details, a supplementary description or the like of a portion or a total of other.

In the following embodiment, when referring to a number of elements or the like (including a number of pieces, a numerical value, an amount, a range or the like), except a case of being clearly shown particularly and a case of being limited to a specific number clearly in principle or the like, the embodiment is not limited to the specific number but may be equal to or larger than or equal to or smaller than the specific number.

In the following embodiment, a constituent element thereof (including also an element step or the like) is not necessarily indispensable naturally except a case of being clearly shown as indispensable particularly and a case of being regarded to be indispensable clearly in principle or the like. Further, in an embodiment or the like, with regard to a constituent element or the like of the embodiment or the like, when referring to as "comprising A", "consisting of A", except a case or the like of clearly showing that the constituent or the like consists only of the element particularly, the other element is not naturally excluded.

Similarly in the following embodiment, when referring to a shape, a positional relationship or the like of a constituent element or the like, it includes an element or the like proximate or similar to the shape or the like substantially except a case of being clearly shown particularly and a case of being regarded otherwise clearly in principle. The same goes with the numerical value and the range described above.

When referring to a material or the like, except a case of being clearly described particularly otherwise or a case of being otherwise in principle or in situation, a specified material is a major material and does not exclude a subsidiary element, an additive, an adding element or the like. For example, a silicon member includes not only a case of pure silicon but includes an added impurity, a binary or ternary alloy (for example, SiGe) or the like constituting silicon as a major element except a case of being clearly shown particularly.

In a total of views for explaining the following embodiments, what has the same function is attached with the same notation as a rule, and a repetitive description thereof will be omitted.

In drawings used in the following embodiments, even when the drawing is a plan view, the view may partially be hatched to make the drawing easy to see.

First Embodiment

A thermal type fluid flow sensor according to the embodiment includes a humidity sensor of a thermal type formed on a substrate the same as that of an element of measuring an air flow, a drive circuit of detecting an air flow signal by supplying a current to a heat generating resistor in the element, a control circuit of calculating the air flow from the air flow signal, and a memory of storing the air flow and a correcting data of an absolute humidity, and the control circuit corrects the air flow from the absolute humidity detected by using the humidity sensor and the correcting data. Further, the thermal type fluid flow sensor according to the embodiment is used by being installed at an intake path of an internal combustion engine of an automobile or the like.

Here, FIG. 1 shows a plan view of an essential portion of the thermal type fluid flow sensor according to the first embodiment.

As shown in FIG. 1, a measuring element 1 which is a thermal type fluid flow sensor includes a semiconductor substrate 2 consisting of a single-crystal silicon, an insulating film (not illustrated) formed on the semiconductor substrate 2, a heat generating resistor 3 formed on the insulating film, a temperature measuring resistor 4 for the heat generating resistor for detecting a temperature of the heat generating resistor 3, a temperature measuring resistor 5, and a heat generating resistor 9 for detecting a humidity. The temperature measuring resistor 4 for the heat generating resistor is formed to surround the periphery of the heat generating resistor 3 except a portion thereof.

The measuring element 1 is an element having a planar shape of a quadrangular shape, which is installed such that air to be measured flows in a direction basically along a main face of the measuring element 1, and orthogonally from one side of the measuring element 1 to a side thereof opposed to the one side. Although substantially a total of the main face of the measuring element 1 is covered with a protecting film (not illustrated), an opening portion 15 is provided at least on the heat generating resistor 3, the temperature measuring resistor 4 for the heat generating resistor, and the temperature measuring resistor 5, at which the protecting film is not formed. Further, the semiconductor substrate 2 at a lower layer of a region formed with the opening portion 15 and the heat generating resistor 9 for detecting the humidity is removed, and a structure of a diaphragm 16 having a thickness thinner than that of other region is constituted. Here, a region in the diaphragm 16 including the heat generating resistor 3, the temperature measuring resistor 4 for the heat generating resistor, and the temperature measuring resistor 5 is an element for measuring the air flow, and is referred to as an air flow detecting portion in the following.

In FIG. 1, an arrow mark of notation 17 designates a flow of air. Although there is a case where air flows in a direction inverse to the flow 17 of air, or a direction other than the inverse direction depending on cases, here, air flows in the direction of the arrow mark of the flow 17 of air in FIG. 1.

The temperature measuring resistor 5 is constituted by upstream side temperature measuring resistors 5a, 5b and downstream side temperature measuring resistors 5c, 5d for detecting an air temperature of air warmed up by the heat generating resistor 3, which are arranged to align in a direction along the flow 17 of air interposing the heat generating resistor 3 in an order of the upstream side temperature measuring resistors 5a, 5b, the heat generating resistor 3, and the downstream side temperature measuring resistors 5c, 5d. Further, here, on the measuring element 1, a region proximate to a side of the measuring element 1 at which air flowing from the direction of the arrow mark of the flow 17 of air initially arrives is referred to as upstream side, and a region at which air arrives more lately than the upstream side is referred to as downstream side.

Further, an air temperature measuring resistor 6 for measuring a temperature of air, and resistors 7, 8 for controlling a temperature of a heater are formed above the measuring element 1. The heat generating resistor 3, the temperature measuring resistor 5, the temperature measuring resistor 4 for the heat generating resistor, the heat generating resistor 9 for detecting the humidity, the air temperature measuring resistor 6, and the resistors 7, 8 for controlling the heater temperature are formed by working the same metal film, and formed in the same layer in a face in parallel with the main face of the semiconductor substrate 2, and upper and lower sides thereof are covered with insulating films.

Among four sides of the measuring element 1, at a vicinity of one side of two sides along the flow 17 of air, a terminal electrode 10 for connecting a signal of the measuring element 1 to an external circuit is formed. The terminal electrode 10 consists of plural terminal electrodes 10a, 10b, 10c, 10d, 10e, 10f, 10g, 10h, 10i, 10j, and 10k and the members are made of Al. Here, the terminal electrode 10 is formed at a layer upward from respective extension wirings and respective resistors. Further, the respective resistors referred to here designate the heat generating resistor 3, the temperature measuring resistor 4 for the heat generating resistor, the temperature measuring resistor 5, the air temperature measuring resistor 6, the resistors 7, 8 for controlling the heater temperature, and the heat generating resistor 9 for detecting the humidity.

The terminal electrodes 10a, 10b are electrically connected to the heat generating resistor 3 by way of extension wirings 11a, 11b, the terminal electrode 10c is electrically connected to the temperature measuring resistor 4 for the heat generating resistor and the air temperature measuring resistor 6 by way of an extension wiring 11c, and the terminal electrode 10d is electrically connected to the temperature measuring resistor 4 for the heat generating resistor and the resistor 7 for controlling the heater temperature by way of an extension wiring 11d. The terminal electrode 10e is electrically connected to the air temperature measuring resistor 6 and the resistor 8 for controlling the heater temperature by way of an extension wiring 11e. The terminal electrode 10f is electrically connected to the upstream side temperature measuring resistor 5a and the downstream side temperature measuring resistor 5c by way of extension wirings 11f1, 11f2. The terminal electrode 10g is electrically connected to the upstream side temperature measuring resistor 5b, the resistors 7, 8 for controlling the heater temperature, and the downstream side temperature measuring resistor 5d by way of extension wirings 11g1, 11g2, 11g3, and 11g4. The terminal electrode 10h is electrically connected to the upstream side temperature measuring resistor 5b and the downstream side temperature measuring resistor 5c by way of extension wirings 11h1, 11h2, and the terminal electrode 10i is electrically connected to the upstream side temperature measuring resistor 5a and the downstream side temperature measuring resistor 5d by way of extension wirings 11i1, 11i2. The terminal electrodes 10j, 10k are electrically connected to the heat generating resistor 9 for detecting the humidity by way of extension wirings 11j, 11k. Further, the respective extension wirings are electrically connected respectively to the terminal electrodes by way of connecting holes 12.

A wiring width of the heat generating resistor 3 is, for example, about 1 through 150 μm, a wiring width of the temperature measuring resistor 4 for the heat generating resistor is, for example, about 0.5 through 100 μm, and respective wiring widths of the temperature measuring resistor 5, the air temperature measuring resistor 6, and the resistors 7, 8 for controlling the heater temperature are, for example, about 0.5 through 10 μm. A wiring width of the heat generating resistor 9 for detecting the humidity is, for example, about 0.5 through 100 μm. However, it is preferable to make the wiring width of the heat generating resistor 9 for detecting the humidity equal to or smaller than 10 μm to reduce an area of the measuring elements 1. Further, respective widths of the extension wirings 11a, 11b, 11c, 11d, 11e, 11f1, 11f2, 11g1, 11g2, 11g3, 11g4, 11h1, 11h2, 11i1, 11i2, 11j, and 11k are, for example, about 30 through 500 μm.

Further, the heat generating resistor 9 for detecting the humidity and the extension wirings 11*j*, 11*k* as well as the terminal electrodes 10*j*, 10*k* connected thereto are not electrically connected to other resistors, other extension wirings or other terminal electrodes on the measuring element 1. This is because a temperature of heating the heat generating resistor 9 for detecting the humidity is preferably higher than a temperature of the heat generating resistor 3 of the air flow detecting portion, and there is a possibility of constituting a high current. It is preferable that even a ground (earth) wiring is not connected to the extension wiring of the air flow detecting portion and is formed separately therefrom on the measuring element 1. Further, the extension wirings 11*j*, 11*k* formed by a metal the same as that of the heat generating resistor 9 for detecting the humidity are disposed on a downstream side of other extension wiring, and also the terminal electrodes 10*j*, 10*k* electrically connected to the extension wirings 11*j*, 11*k* are disposed on a downstream side of other terminal electrode.

When the extension wiring 11*j* or 11*k* of the heat generating resistor 9 for detecting the humidity is connected to other extension wirings of the air flow detecting portion, an extension wiring of the heat generating resistor 9 for detecting the humidity and the other extension wiring of the air flow detecting portion are electrically connected by extending a portion of the terminal electrode 10 in a direction of the air flow detecting portion, and intersecting the portion with the extension wiring at a lower layer. Further, although not illustrated, the terminal electrode 10 is covered with silicone resin or the like to protect the terminal electrode 10 from a corrosion of sulfur or the like. It is necessary to prevent the silicone resin from covering the resistor of the resistor 8 for controlling the heater temperature or the like, and therefore, a constant or more distance is needed between the resistor of the resistor 8 for controlling the heater temperature or the like and the terminal electrode 10 above the measuring element 1. Therefore, when the terminal electrode 10 is formed to extend in the direction of the air flow detecting portion, an area of the measuring element 1 is increased, which amounts to an increase in a fabrication cost of the thermal type fluid flow sensor. Also therefrom, it is preferable that the wiring of the heat generating resistor 9 for detecting the humidity is not connected to other extension wiring and is formed separately therefrom above the measuring element 1.

Further, the heat generating resistor 9 for detecting the humidity is not formed at a region extending the region formed with the heat generating resistor 3, the temperature measuring resistor 4 for the heat generating resistor, and the temperature measuring resistor 5 in the direction along the direction of the flow 17 of air, but is arranged at a position of being remote from the heat generating resistor 3, the temperature measuring resistor 4 for the heat generating resistor, and the temperature measuring resistor 5 and on a downstream side of the flow 17 of air in the diaphragm 16. This is for making a heat influence as small as possible between the element of measuring the air flow and the heat generating resistor 9 for detecting the humidity by arranging the heat generating resistor 9 for detecting the humidity at an end above the diaphragm 16. Here, by not forming the heat generating resistor 9 for detecting the humidity at the region extending the region formed with the heat generating resistor 3, the temperature measuring resistor 4 for the heat generating resistor, and the temperature measuring resistor 5 in the direction along the direction of the flow 17 of air, air warmed up by the heat generating resistor 3 or the like is prevented from impinging on the heat generating resistor 9 for detecting the humidity. Further, it is also prevented that air warmed up by the heat generating resistor 9 for detecting the humidity impinges on the heat generating resistor 3 or the like.

Further, the heat generating resistor 9 for detecting the humidity is formed such that a longitudinal direction thereof is along the direction of the flow 17 of air, an air cavity layer 14 is formed on an upper side of the heat generating resistor 9 for detecting the humidity, and a protecting film formed above the air cavity layer 14 is formed with plural holes 13 reaching the air cavity layer 14 from an upper face of the protecting film. Further, the holes 13 are formed intermittently to be along the extending heat generating resistor 9 for detecting the humidity, and are not formed right above the heat generating resistor 9 for detecting the humidity. A hole diameter of the hole 13 is equal to or less than 2 μm, and the hole is constituted by a structure of exchanging air from outside for measuring the humidity and air which is warmed up in the air cavity layer 14 by way of the hole 13. The protecting film of the air cavity layer 14 is a film having a low heat transfer coefficient of an insulating film or the like, and the heat generating resistor 9 for detecting the humidity is made to be able to be restrained from being cooled as less as possible by the flow of air by not transferring heat.

In a planar shape shown in FIG. 1, in a direction orthogonally intersecting with a longitudinal direction of the heat generating resistor 9 for detecting the humidity, a width of the air cavity layer 14 is formed to be wider than that of the heat generating resistor 9 for detecting the humidity. Further, a humidity detecting portion is constituted by a region of an upper portion and a lower portion of the air cavity layer 14, and including the heat generating resistor 9 for detecting the humidity, the holes 13 and the air cavity layer 14. The air flow detecting portion and the humidity detecting portion are regions formed separately from each other in the same diaphragm 16.

The measuring element 1 is constituted by a structure in which an air humidity of the flow 17 of air is measured by the air temperature measuring resistor 6, a temperature difference (ΔTh) is calculated by comparing the air temperature with an increase in a resistance of the temperature measuring resistor 4 for the heat generating resistor heated by the heat generating resistor 3, and resistance values of the upstream side temperature measuring resistors 5*a*, 5*b* and the downstream side temperature measuring resistors 5*c*, 5*d* are respectively changed by the flow 17 of air warmed up by the heat generating resistor 3.

According to the first embodiment, in order to conform resistance values of the respective resistors to design values, the respective resistors of the heat generating resistor 3, the temperature measuring resistor 4 for the heat generating resistor, the temperature measuring resistor 5, the air temperature measuring resistor 6, the resistors 7, 8 for controlling the heater temperature, and the heat generating resistor 9 for detecting the humidity are constituted by foldback meandering wiring structures.

Figure 2:
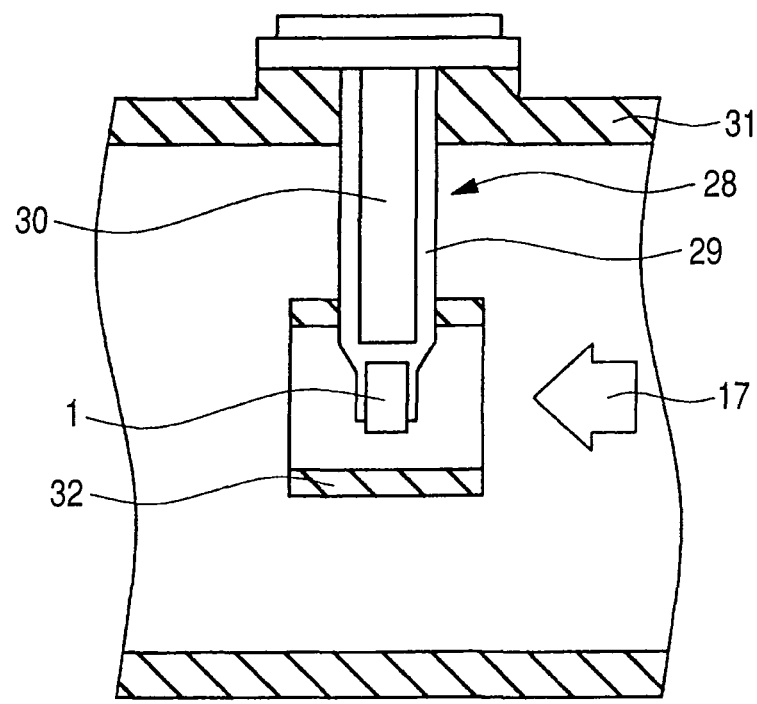
FIG. 2 is an outline arrangement view of a thermal type air flow meter mounted with a thermal type fluid flow sensor attached to an intake path of an internal combustion engine of an automobile or the like according to the first embodiment of the present invention.

FIG. 2 is an outline arrangement view of a thermal type air flow meter 28 attached to an intake path of an internal combustion engine of an automobile or the like, and mounted with the thermal type fluid flow sensor according to the embodiment. The thermal type air flow meter 28 is constituted by the measuring element 1 which is the thermal type fluid flow sensor, a supporting member 29 constituted by an upper portion and a lower portion, and an external circuit 30, and the measuring element 1 is arranged in a sub path 32 which is present in an air path 31. The external circuit 30 is electrically connected to a terminal of the measuring element 1 by way of the supporting member 29. Intake air flows in a direction of the flow 17 of air designated by an arrow mark of FIG. 2, or in a direction inverse to the flow 17 of air depending on a condition of the internal combustion engine. A direction of the flow 17 of air can be regarded as the same direction as directions of extending the air path 31 and the sub path 32. Further, in FIG. 2, only the air path 31 and the sub path 32 having a cylindrical shape are shown by sectional views, and the thermal type air flow meter 28 including the measuring element 1, the external circuit 30, and the supporting member 29 is shown by a plan view.

Figure 3:
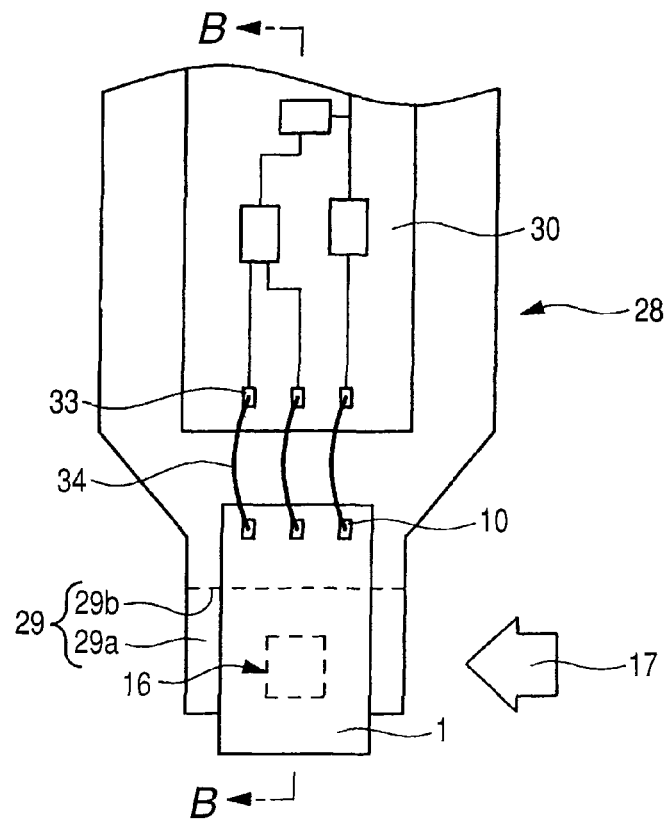
FIG. 3 is a plan view enlarging an essential portion by enlarging a portion of FIG. 2.
Figure 4:
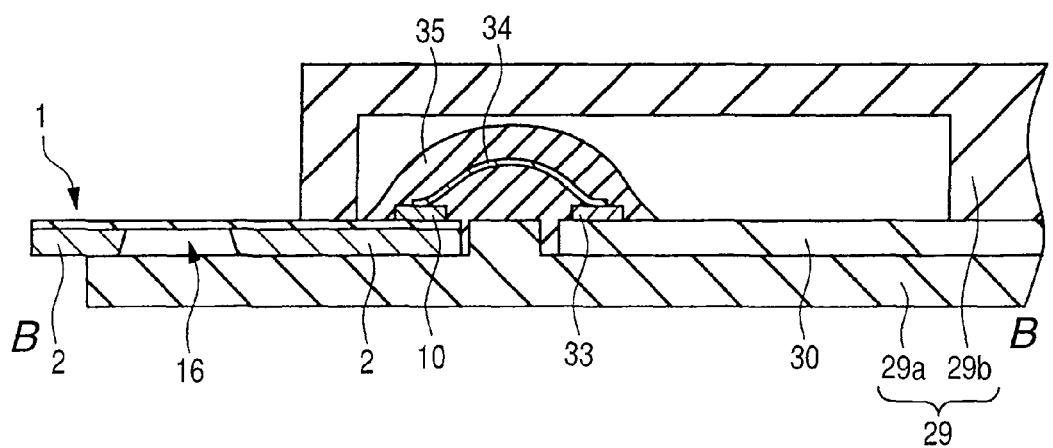
FIG. 4 is a sectional view of the essential portion taken along a line B-B of FIG. 3.

FIG. 3 is a plan view of an essential portion enlarging portions of the measuring element 1 and the supporting member 29 shown in FIG. 2, and FIG. 4 is a sectional view of an essential portion taken along a line B-B of FIG. 3. Further, in FIG. 3, in order to make a structure easy to understand, a supporting member 29b of an upper portion and silicone resin 35 shown in FIG. 4 are not illustrated. In FIG. 3, an end portion of the supporting member 29b of the upper portion is indicated by a broken line.

As shown in FIGS. 3 and 4, the measuring element 1 is fixed onto a supporting member 29a of a lower portion, and the terminal electrode 10 of the measuring element 1 and a terminal electrode 33 of the external circuit 30 are electrically connected by a wire bonding method using, for example, a gold wire 34 or the like.

Further, the terminal electrode 10, the terminal electrode 33 of the external circuit 30, and the gold wire 34 are covered with the silicone resin 35 in order to protect the terminal electrodes 10, 33 and the gold wire 34 from corrosion by air including a sulfur content flowing in from the engine. Further, the silicone resin 35 covering a portion of the measuring element 1 is formed such that the silicone resin 35 does not cover the diaphragm 16 and the air temperature measuring resistor 6 and the resistors 7, 8 for controlling the heater temperature in FIG. 1 and the terminal electrode 10 is not exposed. Further, as shown in FIG. 3 and FIG. 4, the electrodes 10, 33 and the gold wire 34 are protected by being covered by the supporting member 29b of the upper portion. The terminal electrodes 10, 33 and the gold wire 34 may be hermetically sealed to protect, or may not be hermetically sealed by the supporting member 29b of the upper portion.

Figure 5:
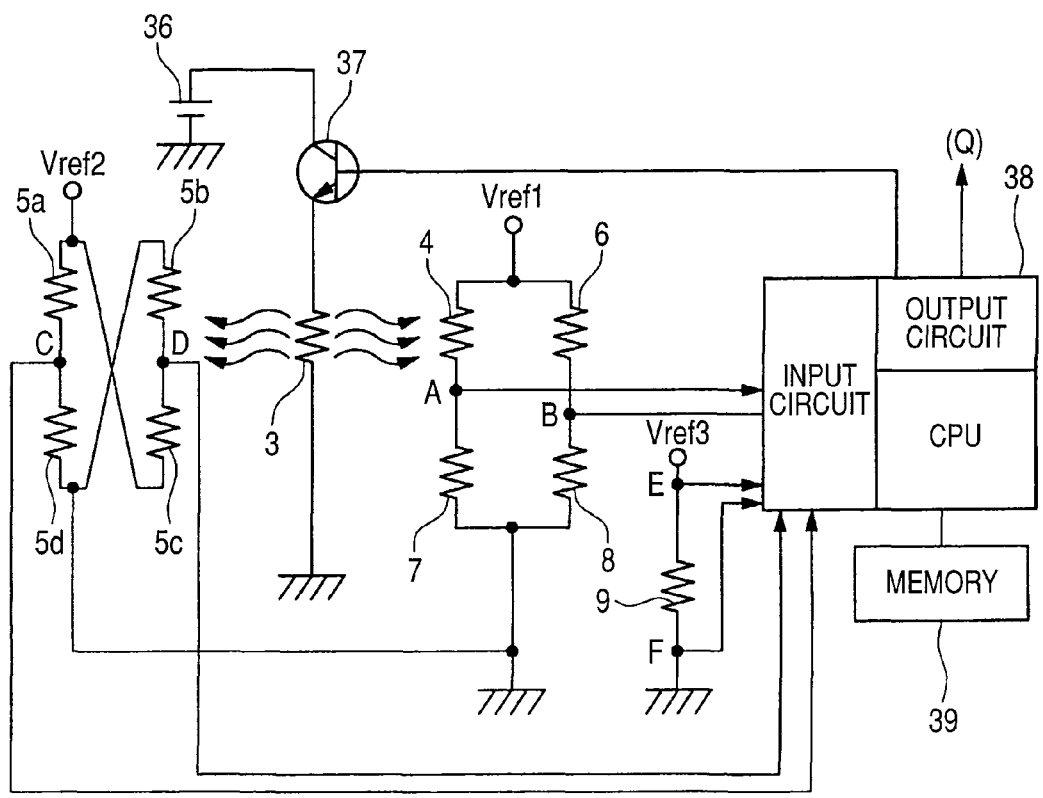
FIG. 5 is a circuit diagram showing an example of the thermal type fluid flow sensor according to the first embodiment of the present invention.

Next, an explanation will be given of an operation of the thermal type air flow meter 28 described above in reference to FIG. 5. FIG. 5 is a circuit diagram showing the measuring element 1 and the external circuit 30 according to the first embodiment, notation 36 designates a power source, notation 37 designates a transistor for making a heating current flow to the heat generating resistor 3, notation 38 designates a control circuit including an output circuit having an A/D converter and the like and CPU (Central Processing Unit) of executing an operation processing, and notation 39 designates a memory.

The power source 36, the transistor 37, and an input circuit and an output circuit in the control circuit 38 are a drive circuit of supplying a current to the heat generating resistor 3. The memory 39 is a memory stored with the air flow and the correcting data of the absolute humidity. The control circuit 38 calculates the air flow from the air flow signal, and corrects the air flow from the absolute humidity detected by using the heat generating resistor 9 for detecting the humidity and the correcting data.

Further, the circuit includes two bridge circuits. One of the two bridge circuits is a heater controlling bridge circuit constituted by the temperature measuring resistor 4 for the heat generating resistor, the air temperature measuring resistor 6, and the resistors 7, 8 for controlling the heater temperature, and other thereof is a temperature sensor bridge circuit by the upstream side temperature measuring resistors 5a, 5b and the downstream side temperature measuring resistors 5c, 5d which are the four temperature measuring resistors.

In the measuring element 1 shown in FIG. 1, the terminal electrode 10c is electrically connected to both of the air temperature measuring resistor 6 and the temperature measuring resistor 4 for the heat generating resistor, and a predetermined potential Vref1 in FIG. 5 is supplied to the terminal electrode 10c thereby. Further, the terminal electrode 10f in FIG. 1 is electrically connected to both of the upstream side temperature measuring resistor 5a and the downstream side temperature measuring resistor 5c, and a predetermined potential Vref2 in FIG. 5 is supplied to the terminal electrode 10f thereby. Further, in FIG. 1, the terminal electrode 10g is electrically connected respectively to the two resistors 7, 8 for controlling the heater temperature, the upstream side temperature measuring resistor 5b, and the downstream side temperature measuring resistor 5d by way of the extension wiring 11g, and the terminal electrode 10g is constituted by a ground potential as shown in FIG. 5.

Further, the terminal electrode 10d electrically connected to both of the temperature measuring resistor 4 for the heat generating resistor and the resistor 7 for controlling the heater temperature by way of the extension wiring 11d in FIG. 1 corresponds to a node A in FIG. 5. Further, the terminal electrode 10e electrically connected to both of the air temperature measuring resistor 6 and the resistor 8 for controlling the heater temperature by way of the extension wiring 11e in FIG. 1 corresponds to a node B in FIG. 5. Further, the terminal electrode 10i connected to both of the upstream side temperature measuring resistor 5a and the downstream side temperature measuring resistor 5d by way of the extension wirings 11i1, 11i2 in FIG. 1 corresponds to a node C in FIG. 5. Further, the terminal electrode 10h connected to both of the upstream side temperature measuring resistor 5b and the downstream side temperature measuring resistor 5c by way of the extension wirings 11h1, 11h2 in FIG. 1 corresponds to a node D in FIG. 5.

Although the ground potentials of the heater control bridge circuit and the temperature sensor bridge circuit are supplied by the common terminal electrode 10g of FIG. 1 according to the embodiment, terminal electrodes may be increased, and the respective terminal electrodes may be set to the ground potential.

In FIG. 5, in the heater control bridge circuit, respective resistance values of the temperature resistor 4 for the heat generating resistor, the air temperature measuring resistor 6, and the resistors 7, 8 for controlling the heater temperature are set such that a potential difference between the node A (terminal electrode 10d) and the node B (terminal electrode 10e) becomes 0 V when a temperature of a gas heated by the heat generating resistor 3 is higher than the intake temperature by a certain constant temperature ($\Delta$Th, for example, 100° C.). It is designed that when the constant temperature ($\Delta$Th) described above is deviated from the setting, a potential difference is produced between the node A and the node B, and the bridge circuit is maintained in an equilibrium state (a potential difference between the node A and the node B: 0 V) by changing a current flowing to the heat generating resistor 3 by controlling the transistor 37 by the control circuit 38.

On the other hand, the temperature sensor bridge circuit is designed such that respective distances from the heat generating resistor 3 to the upstream side temperature measuring resistors 5a, 5b and the downstream side temperature measuring resistors 5c, 5d become the same distance. Therefore, regardless of heating by the heat generating resistor 3, in a windless state, a potential difference between the node C (terminal electrode 10i) and the node D (terminal electrode $10h$) is brought into an equilibrium state to be 0 V. When a voltage is applied to the heat generating resistor 3, and intake air flows in the direction of the flow 17 of air in FIG. 1, temperatures of the upstream side temperature measuring resistors 5a, 5b which are warmed up by the heat generating resistor 3 become low, temperatures of the downstream side temperature measuring resistors 5c, 5d become high, the resistance value of the temperature measuring resistor 5 differs between the upstream side and the downstream side, a balance of the temperature sensor bridge circuit is made off, and a difference voltage is generated between the node C and the node D. The reference voltage is detected as an air flow signal and is inputted to the control circuit 38, and an air flow (Q) calculated from a comparison table of the difference voltage and the air flow of the memory 39 is subjected to an operation processing. Further, even when the flow 17 of air in FIG. 1 is in an inverse direction, the air flow is known similarly, and therefore, an inverse flow can also be detected.

Next, an explanation will be given of a correction by a humidity. In FIG. 5, the heat generating resistor 9 for detecting the humidity which is a humidity detecting portion of a thermal type is constituted by a circuit separately from a circuit including other heat generating resistor. A voltage value (or current value) when the heat generating resistor 9 for detecting the humidity is made to generate heat by a constant current value Iref3 (or voltage value Vref3) is inputted from a node E (terminal electrode $10j$ in FIG. 1) and a node F (terminal electrode $10k$ in FIG. 1) to the control circuit 38, an absolute humidity is calculated from an already known comparison table of an absolute humidity and a resistance value which have been previously measured of the memory 39, and the above-described air flow is corrected by calculating a correction coefficient and is outputted. Further, after calculating the absolute humidity, the transistor 37 is controlled by the control circuit 38 such that the heater temperature is elevated by an amount of a temperature drop by the humidity.

Here, an explanation will be given of a principle of operating the humidity detecting portion. A constant current flows in the heat generating resistor 9 for detecting the humidity, and Joule heat is generated from the heat generating resistor 9 for detecting the humidity to heat surrounding air. When there is a water content in air, the water content included in air is evaporated by generating heat by the heat generating resistor 9 for detecting the humidity. At this occasion, heat (evaporation heat) is deprived from the heat generating resistor 9 for detecting the humidity, and a heat generating temperature of the heat generating resistor 9 for detecting the humidity is dropped. That is, a heat amount deprived from the heat generating resistor 9 for detecting the humidity differs by a case of a large amount of the water content in air and a case of a small amount of the water content in air, and the temperature of the heat generating resistor 9 for detecting the humidity differs.

Figure 6:
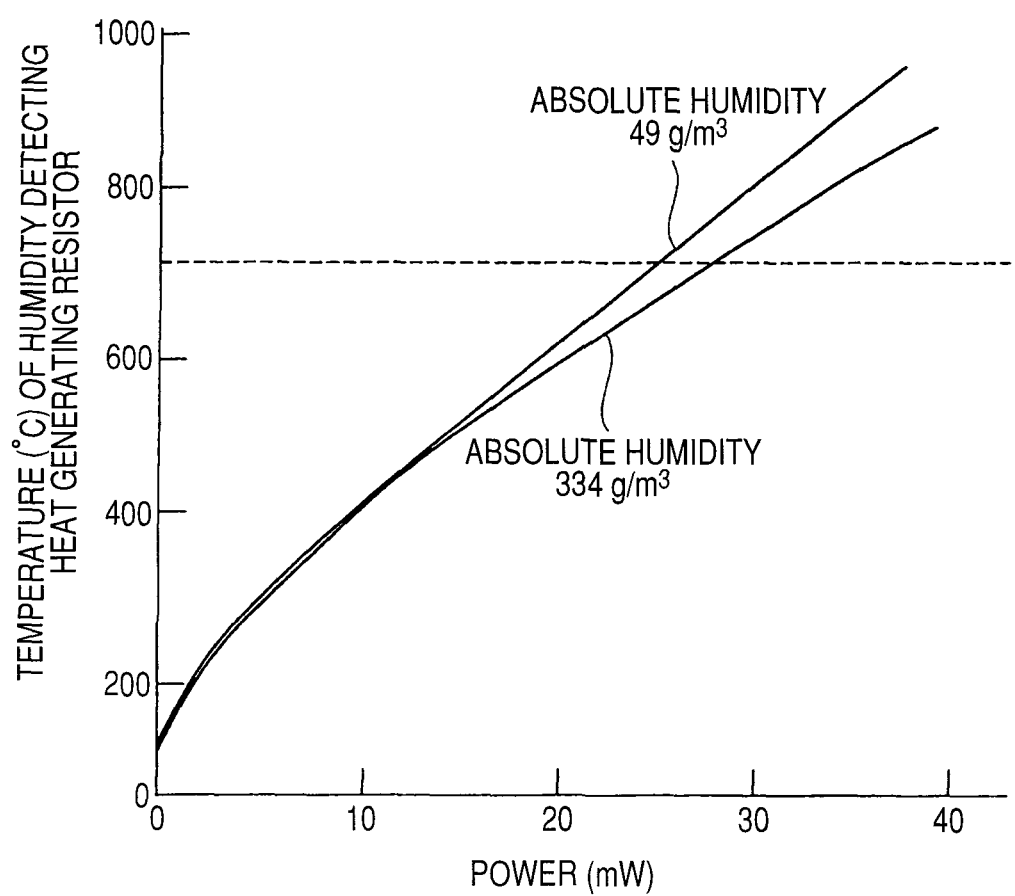
FIG. 6 is a diagram showing a correlation between power consumption of a heat generating resistor for detecting a humidity and a temperature of the heat generating resistor for detecting the humidity according to the first embodiment of the present invention.

FIG. 6 is a graph showing a correlation between power consumption and the temperature of the heat generating resistor 9 for detecting the humidity when a current flowing to the heat generating resistor 9 for detecting the humidity having a wiring width of 2 µm and a wiring length of 250 µm increases. Further, an air temperature is made to be 85° C. constant, and an absolute humidity is compared with regard to two conditions of 49 g/m³ and 334 g/m³.

For example, as is known from FIG. 6, when the same power is supplied to the heat generating resistor 9 for detecting the humidity, an amount of heat deprived is smaller when the absolute humidity is smaller. The temperature of the heat generating resistor 9 for detecting the humidity is therefore elevated. In other words, in order to make the temperature of the heat generating resistor 9 for detecting the humidity constant, the higher the humidity, the larger the heat loss, and therefore, the higher the humidity, the more power is needed. Accordingly, it is known from FIG. 6 that the relationship between the temperature of the heat generating resistor 9 for detecting the humidity and the power supplied is changed by changing the absolute humidity.

Here, the relationship between the power consumption and the temperature of the heat generating resistor 9 for detecting the humidity can be expressed by an approximate equation of the second degree described below.

$$Th = k1 \cdot Ph + k2 \cdot Ph^2 + Ta$$

In the above-described equation, notation Th designates a temperature of the heat generating resistor 9 for detecting the humidity, notation Ph designates a power consumed in the heat generating resistor 9 for detecting the humidity, notation Ta designates an air temperature, notation k1 designates a first degree term of the approximate equation, and notation k2 designates a second degree term of the approximate equation.

Figure 7:
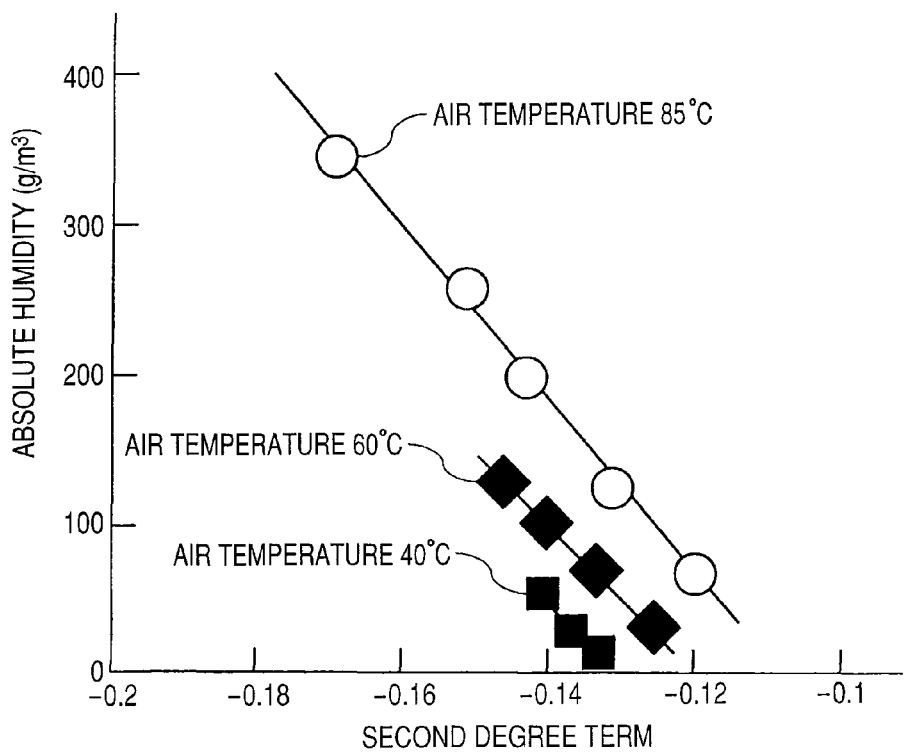
FIG. 7 is a diagram showing a correlation of the heat generating resistor for detecting the humidity with an absolute humidity according to the first embodiment of the present invention.

When a result of measurement under previous conditions of different absolute humidities is calculated by the approximate equation, the first degree term k1 and Ta stay almost equal, and only the second degree term k2 is changed. That is, the difference of the absolute humidity appears in the difference of the second term k2. FIG. 7 shows a graph showing a correlation between the second degree term k2 of the approximate equation and the absolute humidity when the approximate equation is applied to a case of changing the air temperature Ta and the absolute humidity. It is known from the result that the second degree term k2 of the approximate equation and the absolute humidity are brought into a proportional relationship. A constant current flows in the heat generating resistor 9 for detecting the humidity, and therefore, by measuring a voltage between the terminal electrode $10j$ and the terminal electrode $10k$, the power Ph and a resistance value of the heat generating resistor 9 for detecting the humidity are known, and also the temperature Th is known from the resistance value of the heat generating resistor 9 for detecting the humidity. That is, therefore, when the air temperature Ta is known, by the approximate equation described above, the temperature Th, the power Ph, the first degree term k1, and the air temperature Ta are known. The second degree term k2 can therefore be calculated from the approximate equation. Thereby, the second degree term k2 can be calculated by a calculation, and the absolute humidity can be derived from a correlation comparison table of the second degree term k2 and the absolute humidity stored in the memory 39, as shown in FIG. 7.

From the calculated absolute humidity, the correction coefficient is read from a correlation comparison table of the absolute humidity and the air flow stored to the memory 39, and the air flow is corrected. Further, a combustion efficiency can be increased by outputting data of the absolute humidity calculated here to a fuel injection drive circuit of an automobile as it is to be utilized for controlling an explosion timing of an engine.

Therefore, as described above, in order to detect the absolute humidity and correct the flow, it is necessary that the temperature of the heat generating resistor 9 for detecting the humidity with regard to the current and the voltage of the heat generating resistor 9 for detecting the humidity substantially coincides always with data (data calculated by excluding an extraneous factor) stored to the memory 39. Therefore, in order to accurately detect the absolute humidity, it is necessary to exclude the extraneous factor. That is, it is necessary that the heat generating resistor 9 for detecting the humidity is constituted by a pertinent temperature in accordance with the absolute humidity by preventing the heat generating resistor 9 for detecting the humidity from being cooled excessively by the flow of air and influenced by heat or the like generated by the heat generating resistor 3.

According to the embodiment, the temperature of the heat generating resistor 9 for detecting the humidity is prevented from being changed by a factor (extraneous factor) other than the heat generated by the heat generating resistor 9 for detecting the humidity and the humidity of air by separating the air flow detecting portion and the humidity detecting portion in the diaphragm 16, arranging the heat generating resistor 9 for detecting the humidity and the hole 13 so as not to overlap each other on a plane, and arranging the heat generating resistor 9 for detecting the humidity to be along the direction of the flow of air.

Next, an explanation will be given of a method of fabricating the thermal type fluid flow sensor according to the first embodiment in an order of steps in reference to FIG. 8 through FIG. 13. FIG. 8 through FIG. 13 are sectional views of an essential portion taken along a line A-A in FIG. 1.

Figure 8:
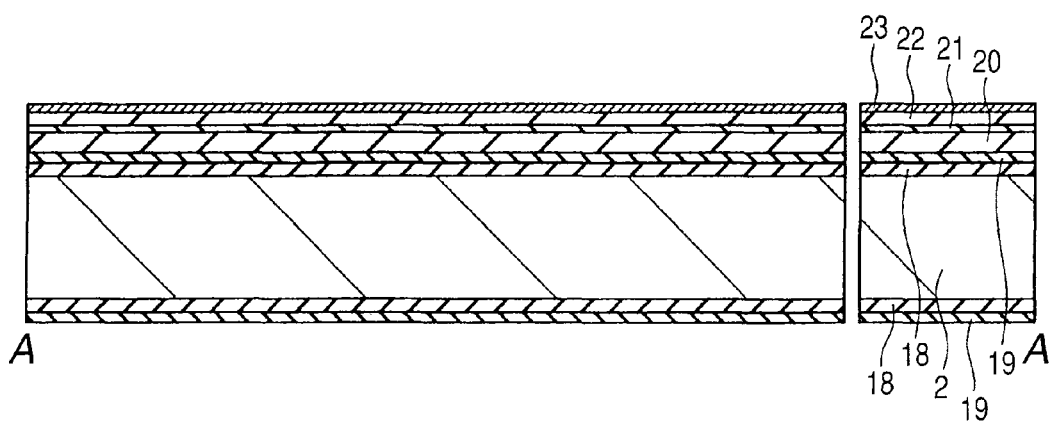
FIG. 8 is a sectional view of an essential portion showing a method of fabricating the thermal type fluid flow sensor according to the first embodiment of the present invention.

First, as shown in FIG. 8, the semiconductor substrate 2 consisting of the single-crystal silicon is prepared. Successively, a first insulating film 18 and a second insulting film 19 are successively formed on a top face and a back face of the semiconductor substrate 2, and thereafter, a third insulating film 20, a fourth insulating film 21, and a fifth insulating film 22 are successively formed above the second insulting film 19 on a top face side of the semiconductor substrate 2. At this occasion, the third insulating film 20, the fourth insulating film 21, and the fifth insulating film 22 are not formed at a bottom face of the second insulating film 19 formed at the back face of the semiconductor substrate 2.

The first insulating film 18 consists of a silicon oxide film formed by, for example, exposing the semiconductor substrate 2 to high temperatures, and a thickness thereof is about 200 nm. The second insulating film 19 consists of a silicon nitride film formed by, for example, a CVD (Chemical Vapor Deposition) method, and a thickness thereof is about 100 through 200 nm. The third insulating film 20 consists of a silicon oxide film formed by a CVD method, and a film thickness thereof is about 500 nm. The fourth insulating film 21 consists of a silicon nitride film formed by using a CVD method similar to the second insulating film 19 or a silicon nitride film formed by using a plasma CVD method, and a film thickness thereof is 20 through 200 nm. The fifth insulating film 22 consists of a silicon oxide film formed by using a plasma CVD method, and a film thickness thereof is 100 nm through 300 nm. The first insulating film 18, the third insulating film 20, and the fifth insulating film 22 are films respectively having compressive stresses of 50 MPa through 250 MPa as residual stresses. The second insulating film 19, and the fourth insulating films 21 are films respectively having tensile stresses of 700 MPa through 1200 MPa. After the respective steps, it is preferable to heat-treat the films at 1000° C. in a nitrogen atmosphere at a furnace body or a lamp heating apparatus particularly after forming the silicon oxide film using the CVD method, or the silicon nitride film using the plasma CVD method for making the films dense.

Next, by forming an Mo (molybdenum) film by a thickness of 150 through 250 nm, by, for example, a sputtering method, a first metal film 23 consisting of the Mo film is formed. At this occasion, for improving an adherence and a crystallinity, a top face of the fifth insulating film 22 of the matrix is etched by about 5 through 20 nm by sputter etching using Ar (argon gas) before forming the Mo film, and a temperature of the substrate in forming the Mo film is made to be 200° C. through 500° C. In order to further improve the crystallinity of the Mo film, the Mo film is subjected to a heating treatment at 1000° C. in a nitrogen atmosphere at a furnace body or a lamp heating apparatus after forming the Mo film.

Figure 9:
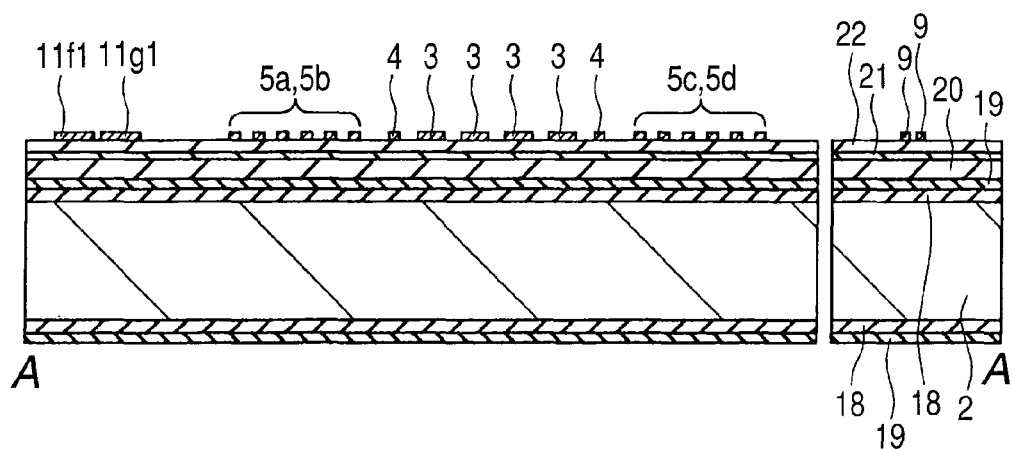
FIG. 9 is a sectional view of an essential portion showing the method of fabricating the thermal type fluid flaw sensor successive to FIG. 8.

Next, as shown in FIG. 9, the first metal film 23 is patterned by using a photolithography method and an etching method, and the heat generating resistor 3, the temperature measuring resistor 4 for the heat generating resistor, the temperature measuring resistor 5 (upstream side temperature measuring resistors 5a, 5b, and downstream side temperature measuring resistors 5c, 5d), the heat generating resistor 9 for detecting the humidity, and the extension wirings 11f1, 11g1 are formed. At this occasion, also the air temperature measuring resistor 6, the resistors 7, 8 for controlling the heater temperature, and the extension wirings 11a, 11b, 11c, 11d, 11e, 11f2, 11g2, 11g3, 11g4, 11h1, 11h2, 11i1, 11i2, 11j and 11k are formed although not illustrated.

Figure 10:
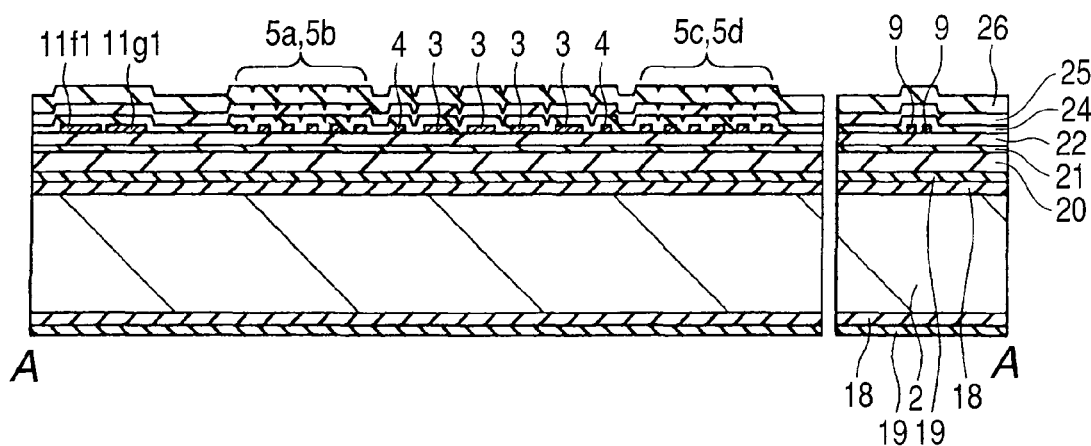
FIG. 10 is a sectional view of an essential portion showing the method of fabricating the thermal type fluid flow sensor successive to FIG. 9.

Next, as shown in FIG. 10, a sixth insulating film 24, a seventh insulating film 25, and an eighth insulating film 26 are successively formed over an entire face of the fifth insulating film 22, and above the heat generating resistor 3, the temperature measuring resistor 4 for the heat generating resistor, the temperature measuring resistor 5, the air temperature measuring resistor 6 (not illustrated), the resistor 7 (not illustrated) for controlling the heater temperature, the resistor 8 for controlling the heater temperature (not illustrated), the heat generating resistor 9 for detecting the humidity, and the extension wirings 11f1, 11g1.

The sixth insulating film 24 consists of a silicon oxide film formed by using a low temperature CVD method using plasma by constituting a raw material by, for example, TEOS (tetraethoxysilane), and a film thickness thereof is about 300 through 500 nm. The seventh insulating film 25 consists of a silicon nitride film formed by, for example, a low temperature CVD method using plasma, and a film thickness thereof is about 150 through 200 nm. The eighth insulating film 26 consists of a silicon oxide film formed by a low temperature CVD method using plasma by constituting a raw material by, for example, TEOS, and a film thickness thereof is about 100 through 500 nm.

The sixth insulating film 24, and the eighth insulating film 26 are films having compressive stresses of 50 MPa through 250 MPa as residual stresses, and the seventh insulting film 25 is a film having a tensile stress of 700 MPa through 1400 MPa. The seventh insulating film 25 consisting of a silicon nitride film formed by a low temperature CVD method using plasma is adjusted to constitute a desired tensile stress by heat-treating the seventh insulating film 25 at 800° C. or higher, preferably, 1000° C. Also with regard to the silicon oxide films constituting the sixth insulating film 24, and the eighth insulating film 26, the humidity resistance is promoted by subjecting the films to a heating treatment at 1000° C. It is therefore preferable to heat-treat the films after forming the films. The second through the fifth, the seventh and the eighth insulating films may respectively be formed by aluminum nitride films other than the silicon nitride films.

Next, although not illustrated, the connection holes 12 exposing portions of the extension wirings 11a, 11b, 11c, 11d, 11e, 11f1, 11f2, 11g1, 11g2, 11g3, 11g4, 11h1, 11h2, 11i1, 11i2, 11j, and 11k, and portions connected to the respective terminal electrodes formed later by a photolithography method are formed at the eighth insulating film 26 by a dry etching method or wet etching or the like. Thereafter, a second metal film consisting of a laminated layer film of an Al alloy film having, for example, a thickness of about 1 µm is formed on the eighth insulating film 26. In order to improve contact thereof with the respective extension wirings, surfaces of the respective extension wirings may be subjected to sputter etching by Ar (argon) gas before forming the second metal film. Further, in order to ensure the contact, by forming a third metal film consisting of a barrier metal film of a TiN (titanium nitride) film or the like before depositing the second metal film, a laminated layer film of a barrier metal film and an Al alloy film may be formed. Here, when the barrier metal film is formed to be relatively thick, a contact resistance is increased. It is therefore preferable that a thickness thereof is about 20 nm. However, when a problem of increasing the resistance can be avoided by sufficiently making a contact area, a thickness of the barrier metal film can be made to be equal to or less than 200 nm. Although the TiN film is pointed out as the barrier metal film, a TiW (titanium tungsten) film, a TiN (titanium) film, or a laminated film of these may also be used.

Next, although not illustrated, the terminal electrodes 10a, 10b, 10c, 10d, 10e, 10f, 10g, 10h, 10i, 10j, and 10k are formed by a dry etching method or wet etching by patterning the second metal film by using a photolithography method.

Figure 11:
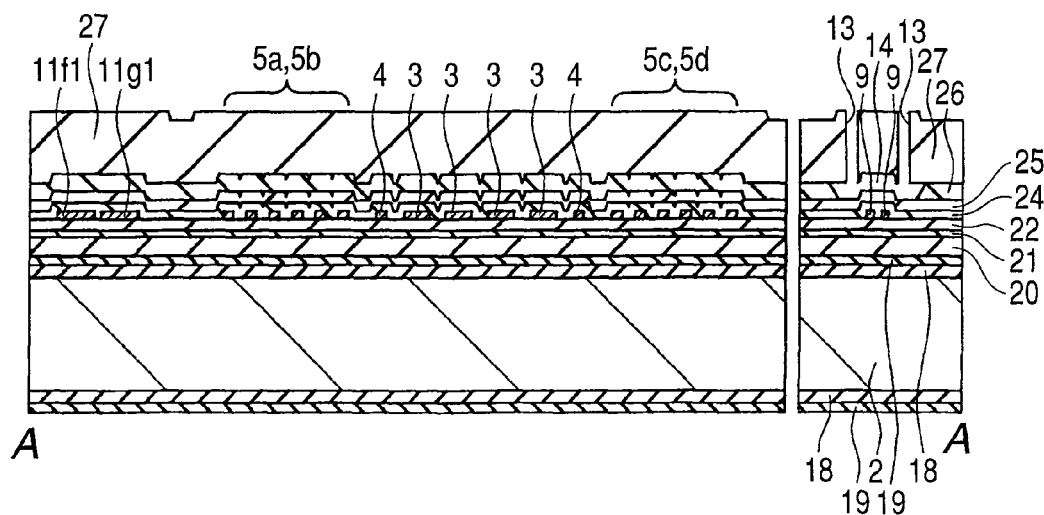
FIG. 11 is a sectional view of an essential portion showing the method of fabricating the thermal type fluid flow sensor successive to FIG. 10.

Next, as shown in FIG. 11, after a protecting film 27 consisting of a polyimide film is deposited on the eighth insulating film 26, the hole 13 for taking in air reaching the eighth insulating film 26 is opened at the protecting film 27 at a vicinity of a top portion of the heat generating resistor 9 for detecting the humidity. Thereafter, the protecting film 27 on the heat generating resistor 9 for detecting the humidity is etched by using a solution mixed with hydrogen fluoride water and pure water or a solution similar thereto, and an air cavity layer 14 is formed on the heat generating resistor 9 for detecting the humidity.

At this occasion, the hole 13 is not formed right above the heat generating resistor 9 for detecting the humidity, but plural ones thereof are formed intermittently at positions remote from right above the heat generating resistor 9 for detecting the humidity sideways, and on both sides of right above the heat generating resistor 9 for detecting the humidity along the extended heat generating resistor 9 for detecting the humidity. Thereby, air from outside can be taken into the air cavity layer 14 while preventing air flowing from the hole 13 from impinging on a top side of the heat generating resistor 9 for detecting the humidity directly. Further, by making a hole diameter of the hole 13 equal to or less than 2 μm, invasion of a large water drop included in air flowing in from outside can be prevented.

According to the embodiment, as shown in FIG. 1, by extending the heat generating resistor 9 for detecting the humidity to prolong the wiring in the direction of the flow 17 of air, it is prevented that the heat generating resistor 9 for detecting the humidity is excessively cooled by the flow 17 of air flowing in from the hole 13 and the heat loss is changed. That is, as shown in FIG. 2, the direction of the flow 17 of air is a direction the same as the direction of extending the air path 31 and the sub path 32, and therefore, the heat generating resistor 9 for detecting the humidity is formed to extend in a direction the same as the direction of extending the air path 31 and the sub path 32.

Further, by forming the heat generating resistor 9 for detecting the humidity at a layer the same as that of other resistor by fabricating steps of a semiconductor, in comparison with a case of forming the humidity detecting portion separately from the measuring element 1 having the air flow detecting portion, the thermal type fluid flow meter can be formed by a smaller number of steps, and the fabrication cost can be reduced.

Figure 12:
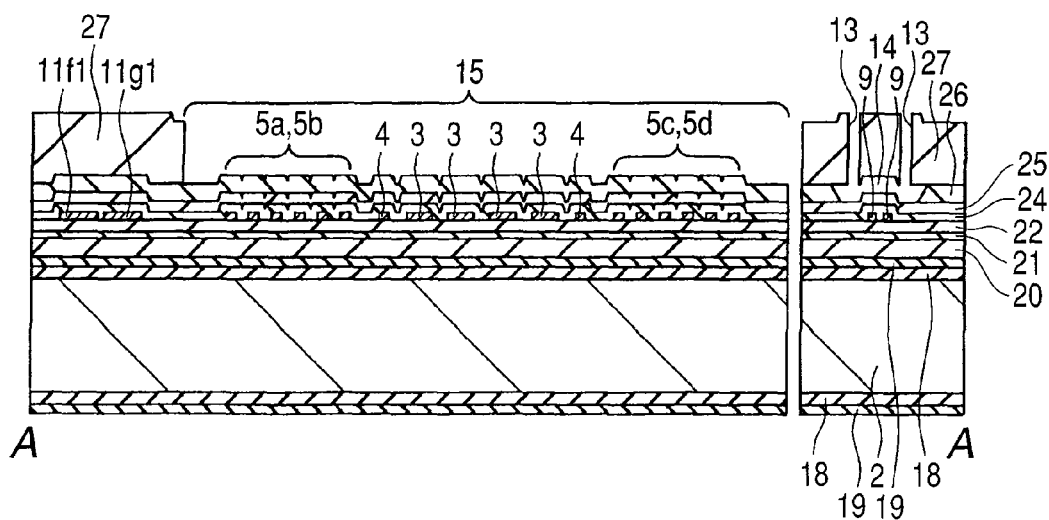
FIG. 12 is a sectional view of an essential portion showing the method of fabricating the thermal type fluid flow sensor successive to FIG. 11.

Next, as shown in FIG. 12, an opening portion 15 of exposing a top face of the eighth insulating film 26 above at least the heat generating resistor 3, the temperature measuring resistor 4 for the heat generating resistor, and the temperature measuring resistor 5 for detecting the air flow, and an opening portion (not illustrated) for connecting the terminal electrodes 10a, 10b, 10c, 10d, 10e, 10f, 10g, 10h, 10i, 10j, and 10k to an external circuit are formed at the protecting film 27 by etching using a photolithography method. Further, the protecting film 27 achieves an effect of protecting the diaphragm 16 from dust mixed to air flowing in from outside at the air flow detecting portion.

Figure 13:
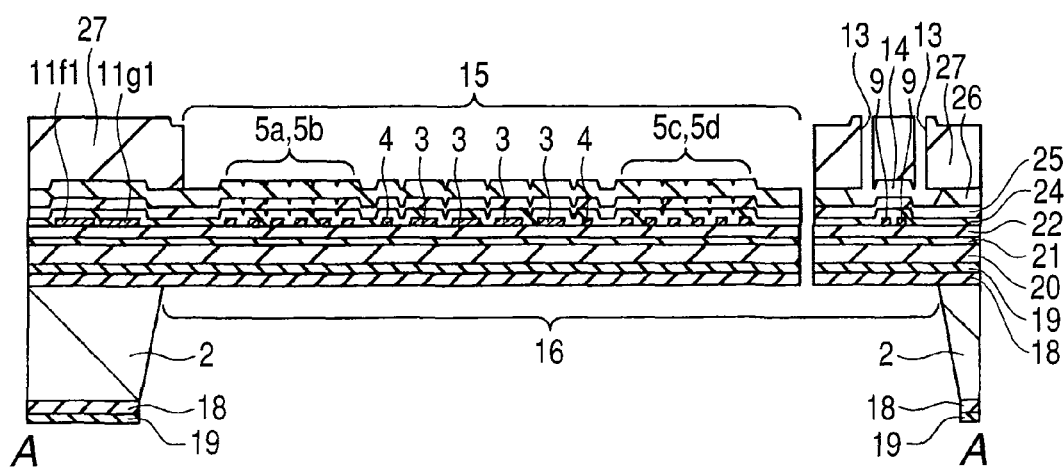
FIG. 13 is a sectional view of an essential portion showing the method of fabricating the thermal type fluid flow sensor successive to FIG. 12.

Next, as shown in FIG. 13, a resist pattern is formed by a photolithography method at a region of the back face of the semiconductor substrate 2 excluding a bottom portion of a region formed with the opening portion 15 and the heat generating resistor 9 for detecting the humidity, the first insulating film 18 and the second insulating film 19 formed at the back face of the semiconductor substrate 2 are removed by dry etching or wet etching, thereafter, the resist pattern is removed. Thereafter, the thermal type fluid flow sensor of the embodiment is completed by forming the diaphragm 16 by subjecting the back face of the semiconductor substrate 2 to wet etching until the bottom face of the first insulating film 18 formed on the main face of the semiconductor substrate 2 is exposed by using KOH (potassium hydroxide), TMAH (tetramethylammonium hydroxide) or an aqueous solution whose major component consists of these by constituting a mask by the remaining first insulating film 18 and the remaining second insulating film 19.

Here, the diaphragm 16 refers to a thin film region mainly formed by an insulating film, and a region at which the semiconductor substrate 2 of the bottom layer is removed. According to the embodiment, a metal film of the heat generating resistor 3 or the like is formed in the insulating film constituting the diaphragm 16, and by removing the semiconductor substrate 2 at a bottom portion thereof, it is prevented that heat generated from the metal film is dispersed by conducting the semiconductor substrate 2.

Specifically, the diaphragm 16 refers to a region including the first insulating film 18, the second insulating film 19, the third insulating film 20, the fourth insulating film 21, the fifth insulating film 22, the sixth insulating film 24, the seventh insulating film 25, the eighth insulating film 26, the heat generating resistor 3, the temperature measuring resistor 4 for the heat generating resistor, the upstream side temperature measuring resistors 5a, 5b, the downstream side temperature measuring resistors 5c, 5d, and the heat generating resistor 9 for detecting the humidity above the region at which the semiconductor substrate 2 is removed. The diaphragm 16 is thinned in a thickness in a vertical direction more than other region in the measuring element 1 by an amount of eliminating the semiconductor substrate 2 as well as the first insulating film 18 and the second insulating film 19 at the bottom portion of the semiconductor substrate 2. Further, the diaphragm 16 is a thin film region including a silicon nitride film or a silicon oxide film and is not a highly flexible film, and is not used by deforming to bend the diaphragm 16 per se or the like.

The opening portion 15 plays a role of enabling to excellently sense a temperature of flowing air, and making air easy to be heated by thinning the thickness of the measuring portion of the measuring element 1. Further, when the semiconductor substrate 2 is present at the bottom portion of the heat generating resistor 3, heat generated from the heat generating resistor 3 is dispersed from the semiconductor substrate 2, the heat generating resistor 3 does not play a role as a heater. The diaphragm 16 formed by removing the semiconductor substrate 2 at the bottom portion of the heat generating resistor 3 therefore increases an efficiency of heating air.

Further, the diaphragm 16 is designed to be larger than the opening portion 15 of the protecting film 27 in a planar shape thereof, and it is preferable to form the diaphragm 16 to be larger than the opening portion 15 by about 50 μm or more at all of sides thereof. It is preferable that a total film thickness of the insulating film constituting the diaphragm 16 is equal to or more than 1.5 μm. When the total film thickness is thinner than 1.5 μm, a strength of the diaphragm 16 is reduced, and a probability of being destructed by an impact or the like of dust included in intake air of an automobile becomes high. However, the first insulating film 18 plays a role of a dumper film when impacted by dust from the bottom face side of the measuring element 1, and the first insulating film 18 may be dispensed with when a constitution in which dust is prevented from impacting is constructed.

Although according to the embodiment, a description has been given of the thermal type fluid flow sensor forming the first metal film 23 which becomes the heat generating resistor 3 or the like by Mo, as a material of the first metal film 23 of the heat generating resistor 3 or the like, a metal other than Mo may be used so far as the metal is made of a material having a high temperature coefficient of resistance (TCR). This is because a sensitivity of measuring a temperature is increased by using a material having a high temperature coefficient of resistance.

As a material of the first metal film 23, for example, the material may be formed from a metal nitride compound, a metal silicide compound, polycrystal silicon or polycrystal silicon doped with phosphor or boron as an impurity. When the material is constituted by a metal, a metal whose major component is α-Ta (alpha tantalum), Ti (titanium), W (tungsten), Co (cobalt), Ni (nickel), Fe (iron), Nb (niobium), Hf (hafnium), Cr (chromium), Pt (platinum), β-Ta (beta tantalum), Zr (zirconium) or the like can be exemplified. When the material is constituted by a metal nitride compound, TaN (tantalum nitride), MoN (molybdenum nitride) or WN (tungsten nitride) or the like can be exemplified. When the material is constituted by a metal silicide compound, WSi (tungsten silicide), MoSi (molybdenum silicide), CoSi (cobalt silicide) or NiSi (nickel silicide) or the like can be exemplified.

Further, although according to the embodiment, an explanation has been given of an example of using a polyimide film for a member of the protecting film 27, a member of heat transfer lower than that of the metal constituting the heat generating resistor 9 for detecting the humidity may be used. That is, as the member of the protecting film 27, a silicon nitride film or an insulating film of silicon, germanium or the like may be used, or a compound film structure provided with a metal film for providing a strength, for example, aluminum or tungsten, or a metal laminated film accompanied by TiN or TiW of a barrier layer at a bottom later may be used.

According to the embodiment, a fabrication cost can be reduced by forming the heat generating resistor for detecting the humidity in the measuring element of the thermal type fluid flow sensor, in comparison with that of a case of separately forming an element of measuring air flow and the heat generating resistor for detecting the humidity. In that case, the heat generating resistor for detecting the humidity is prevented from being cooled by extending the heat generating resistor for detecting the humidity in the direction of the flow of air and taking in air from the small hole. Further, the fabrication cost can be reduced also by forming the heat generating resistor for detecting the humidity by steps of fabricating a semiconductor, preventing an increase in an area of the measuring element by arranging the heat generating resistor for detecting the humidity in the diaphragm formed with the air flow detecting portion, and forming the heat generating resistor for detecting the humidity at the layer the same as that of other heat generating resistor by the same metal film.

Thereby, according to the embodiment, the thermal type fluid flow sensor increasing a detection accuracy can be realized by detecting the humidity in sucked air, and correcting the air flow without influencing the air flow sensor at a low cost.

Second Embodiment

According to the embodiment, a description will be given of a thermal type fluid flow sensor which differs from the first embodiment in that the humidity detecting portion is formed at a diaphragm which differs from that of the air flow detecting portion.

Figure 14:
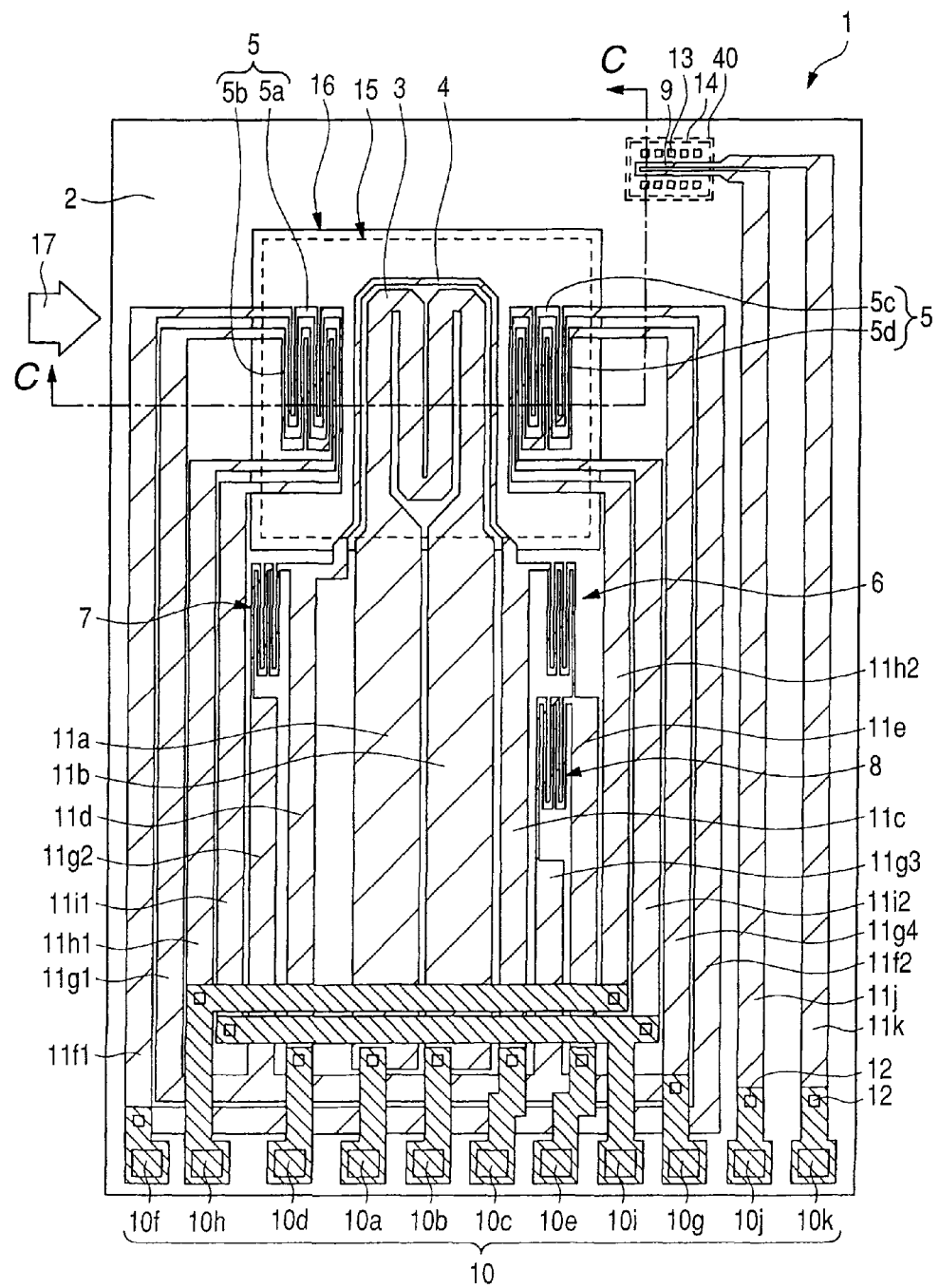
FIG. 14 is a plan view of an essential portion showing an example of a thermal type fluid flow sensor according to a second embodiment of the present invention.

FIG. 14 shows the thermal type fluid flow sensor according to the embodiment. The heat generating resistor 3 for detecting the air flow as well as the temperature measuring resistor 4 for the heat generating resistor, the temperature measuring resistor 5 of detecting the air flow, the air temperature measuring resistor 6 for measuring the air temperature of air, the resistors 7, 8 for controlling the heater temperature, the respective terminal electrodes for connecting the signal of the measuring element 1 to the external circuit, and the respective extension wirings are constructed by structures the same as those of the first embodiment. However, according to the thermal fluid flow sensor of the embodiment, the heat generating resistor 9 for detecting the humidity is formed not above the diaphragm 16 at the bottom layer of the air flow detecting portion but at other position. This is for preventing the heat generating resistor 9 for detecting the humidity from effecting an influence on detection of the air flow by separating the heat generating resistor 9 for detecting the humidity and the air flow detecting portion, and preventing the heat generating resistor 9 for detecting the humidity from being excessively cooled by arranging the heat generating resistor 9 for detecting the humidity at a position deviated from a main stream of the flow 17 of air.

Here, although the diaphragm 16 according to the first embodiment is formed by etching the semiconductor substrate 2 consisting of Si from the back face by KOH solution or the like, when an Si crystal orientation is <100>, the semiconductor substrate 2 is not etched orthogonally thereto, and the opening portion of the back face needs an area considerably larger than a desired area of the diaphragm. Therefore, when the respective diaphragms of the humidity detecting portion and the air flow detecting portion are formed separately from each other by removing the back face of the semiconductor substrate 2, it is necessary that the opening portions of the respective diaphragms of the humidity detecting portion and the air flow detecting portion do not overlap each other. In that case, the heat generating resistor 9 for detecting the humidity needs to be formed to be considerably remote from the air flow detecting portion, and a chip area is increased. Hence, according to the embodiment, the area of the humidity detecting portion is prevented from being increased by forming an air cavity layer 40 by etching the semiconductor substrate 2 just below the heat generating resistor 9 for detecting the humidity.

Figure 15:
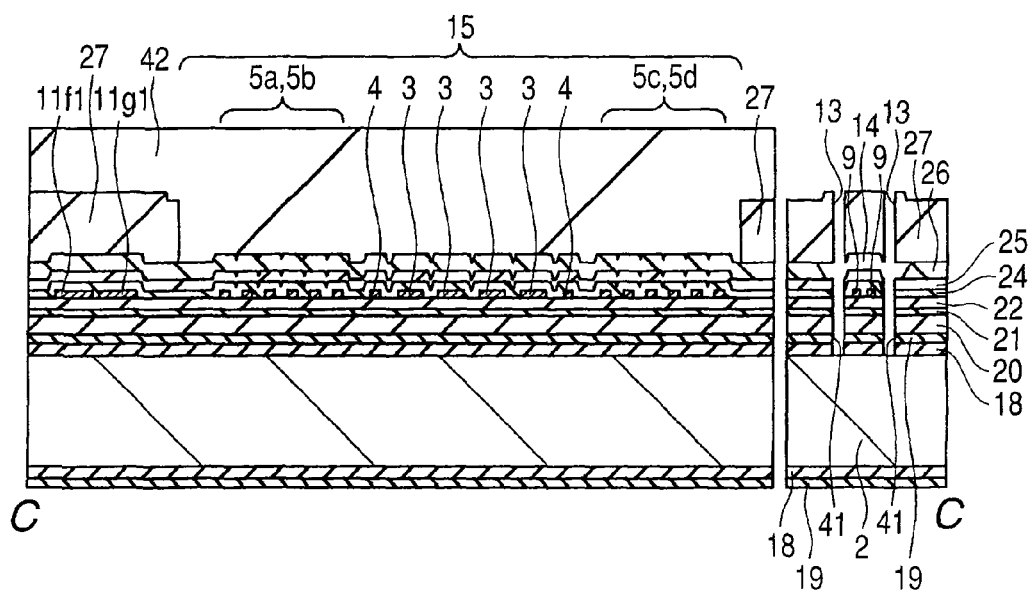
FIG. 15 is a sectional view of an essential portion showing a method of fabricating the thermal type fluid flow sensor according to the second embodiment of the present invention.
Figure 16:
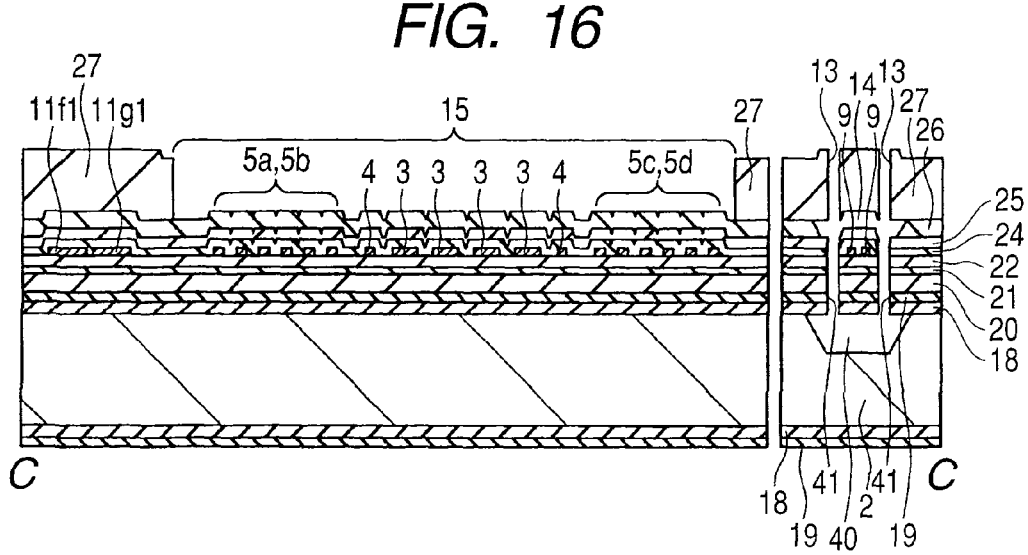
FIG. 16 is a sectional view of an essential portion showing the method of fabricating the thermal type fluid flow sensor successive to FIG. 15.
Figure 17:
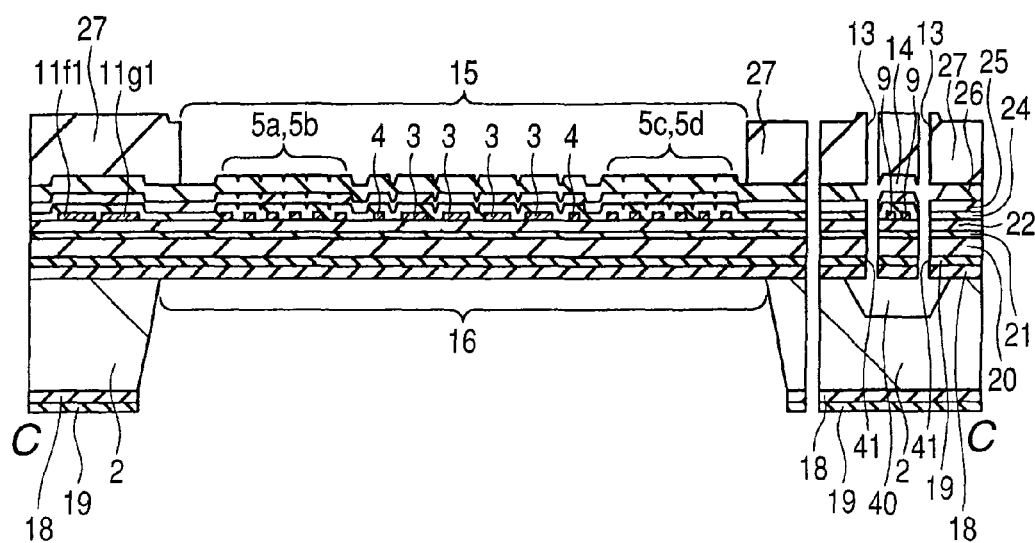
FIG. 17 is a sectional view of an essential portion showing the method of fabricating the thermal type fluid flow sensor successive to FIG. 16.

Next, an explanation will be given of a method of fabricating the thermal type fluid flow sensor according to the embodiment in an order of steps in reference to FIG. 15 through FIG. 17. Further, the fabricating method up to a midway is similar to that of FIG. 8 through FIG. 12 shown by the first embodiment, and therefore, a description will be given of steps after FIG. 12. FIG. 15 through FIG. 17 are sectional views of an essential portion taken along a line C-C in FIG. 14.

First, after carrying out steps similar to steps of FIG. 8 through FIG. 12 of the first embodiment, as shown in FIG. 15, a resist pattern 42 is formed by using a photolithography method to cover the opening portion 15. Thereafter, by dry etching constituting a mask by the resist pattern 42 and the protecting film 27, the seventh insulating film 25, the sixth insulating film 24, the fifth insulating film 22, the fourth insulating film 21, the third insulating film 20, the second insulating film 19, and the first insulating film 18 below the hole 13 are removed, and a hole 41 reaching the top face of the semiconductor substrate 2 from the air cavity layer 14 is formed.

Next, as shown in FIG. 16, after removing the resist pattern 42, by wet etching using a solution of KOH or the like, the top face of the semiconductor substrate 2 below the heat generating resistor 9 for detecting the humidity and the hole 41 is partially removed, and an air cavity layer 40 connected to the hole 41 is formed. Further, it is preferable that a size of the air cavity layer 40 in a planar shape thereof is larger than that of the heat generating resistor 9 for detecting the humidity, and the air cavity layer 40 is a region equivalent to or wider than the air cavity layer 14 above the heat generating resistor 9 for detecting the humidity. Further, it is preferable that a depth of the air cavity layer 40 is deeper than 0.2 µm. The depth of the air cavity layer 40 mentioned here refers to a length in a direction orthogonal to the main face of the semiconductor substrate 2, and a length from the bottom face of the first insulating film 18 above the air cavity layer to an interface of the bottom portion of the air cavity layer 40 and the semiconductor substrate 2. When the air cavity layer 40 is shallowly formed, radiation of heat from the heat generating resistor 9 for detecting the humidity to the semiconductor substrate 2 is increased, the temperature of the heat generating resistor 9 for detecting the humidity cannot be constituted by an elevated temperature, an accuracy of measuring the absolute humidity is deteriorated.

Next, as shown in FIG. 17, a resist pattern is formed by a photolithography method at a region excluding the bottom portion of the opening portion 15, the first insulating film 18 and the second insulating film 19 formed at the back face of the semiconductor substrate 2 are removed by dry etching or wet etching, and thereafter, the resist pattern is removed. After that, the back face of the semiconductor substrate 2 of the bottom layer at the region of forming the heat generating resistor 3 and the temperature measuring resistor 5 is subjected to wet etching until the bottom face of the first insulating film 18 on the main face of the semiconductor substrate 2 is exposed by KOH, TMAH, or an aqueous solution whose major component consists of these by constituting a mask by the remaining first insulating film 18 and the remaining second insulating film 19, and the diaphragm 16 is formed.

Further, it is preferable that the diaphragm 16 is designed to be larger than the opening portion 15 of the protecting film 27 in the planar shape, and is formed to be larger than the opening portion 15 by about 50 µm at all of sides thereof. It is preferable that the total film thickness of the insulating film constituted by the diaphragm 16 is equal to or more than 1.5 µm, and when the total film thickness is thinner than 1.5 µm, the strength of the diaphragm 16 is reduced, and the probability of being destructed by impacting dust or the like included in sucked air of an automobile becomes high. However, the first insulating film 18 plays a role of the dumping film in impacting dust from below, and the first insulating film 18 may be dispensed with so far as a constitution of preventing dust from impacting is constructed.

Further, here, a vicinity of the heat generating resistor 9 for detecting the humidity is constituted by the diaphragm structure by forming the air cavity layer 40, and the diaphragm of the heat generating resistor 9 for detecting the humidity is formed to be smaller than the diaphragm 16 in the planar shape. Further, the diaphragm of the heat generating resistor 9 for detecting the humidity mentioned here refers to a region including the first insulating film 18, the second insulating film 19, the third insulating film 20, the fourth insulating film 21, the fifth insulating film 22, the sixth insulating film 24, the seventh insulating film 25, the eighth insulating film 26, and the heat generating resistor 9 for detecting the humidity between the air cavity layer 40 and the air cavity layer 14.

Further, the heat generating resistor 9 for detecting the humidity is extended to prolong in the direction of the flow of air similar to the first embodiment, the hole 13 is not formed right above the wiring of the heat generating resistor 9 for detecting the humidity, but plural ones thereof are arranged at positions remote from right above the heat generating resistor 9 for detecting the humidity sideways, and intermittently on both sides of the heat generating resistor 9 for detecting the humidity along the heat generating resistor 9 for detecting the humidity. Thereby, the flow 17 of air is prevented from directly impinging on the heat generating resistor 9 for detecting the humidity.

Further, the holes 41 are formed right below the holes 13, and on the both sides of the extending heat generating resistor 9 for detecting the humidity, and a hole diameter thereof may be the same as that of the hole 13. The hole 13 and the hole 41 are operated to take in air to the cavity layer 14 and the cavity layer 40, and exhaust warmed air in the air cavity layer 40 or in the air cavity layer 14 to outside by way of the cavity layer 14 and the hole 13.

According to the embodiment, similar to the first embodiment, the fabrication cost can be reduced by forming the heat generating resistor for detecting the humidity in the measuring element of the thermal type fluid flow sensor in comparison with the case of separately forming the element of measuring air flow and the heat generating resistor for detecting the humidity. At this occasion, the heat generating resistor for detecting the humidity is prevented from being cooled by extending the heat generating resistor for detecting the humidity in the direction of the flow of air, and taking in air from the small hole. Further, the fabrication cost can be reduced also by forming the heat generating resistor for detecting the humidity by steps of fabricating a semiconductor, preventing an increase in the area of the measuring element by arranging the heat generating resistor for detecting the humidity in the diaphragm formed with the air flow detecting portion, and forming the heat generating resistor for detecting the humidity at a layer the same as that of other heat generating resistor by the same metal film.

Further, according to the embodiment, different from the first embodiment, by forming the humidity detecting portion and the air flow detecting portion to be remote from each other, the humidity detecting portion or the air flow detecting portion is prevented from being influenced by heat generated to each other. At this occasion, the fabrication cost can be reduced by reducing the element area by preventing radiation of heat by forming the air cavity layer at the bottom portion of the humidity detecting portion, in comparison with the case of forming the diaphragms at bottom portions of the humidity detecting portion and the air flow detecting portion by etching from the back face.

Thereby, according to the embodiment, the thermal type fluid flow sensor increasing the detection accuracy by correcting the air flow without effecting an influence on the air flow sensor by detecting the humidity of sucked air can be realized at a low cost.

Although as described above, a specific explanation has been given of the present invention which has been carried out by the inventors based on the embodiments, the present invention it not limited to the embodiments but can naturally be changed variously within a range not deviated from the gist of the present invention.

The present invention is widely utilized in fabricating various sensors such as an acceleration sensor, a temperature sensor, a humidity sensor, and a gas sensor as well as the thermal type fluid flow sensor.

What is claimed is:

1. A thermal type fluid flow sensor for measuring an air flow, which is formed on a substrate, comprising:
    a humidity detecting portion; and
    an air flow detecting portion,
    wherein the humidity detecting portion includes:
    a first heat generating resistor;
    an air cavity layer on an upper side of the first heat generating resistor; and
    a first film formed above the air cavity layer,
    wherein the air flow detecting portion includes:
    a second heat generating resistor; and
    a plurality of temperature measuring resistors provided on at least one of an upstream side and a downstream side of the second heat generating resistor to interpose the second heat generating resistor within a face in parallel with a main face of the substrate;
    a temperature measuring resistor for the second heat generating resistor, and
    wherein the first film has a plurality of holes reaching the air cavity layer from an upper face of the first film.

2. The thermal type fluid flow sensor according to claim 1, wherein the first heat generating resistor in the humidity detecting portion and the second heat generating resistor and the temperature measuring resistors in the air flow detecting portion are metal films whose major component is any one of molybdenum, alpha tantalum, titanium, tungsten, cobalt, nickel, iron, niobium, hafnium, chromium, zirconium, platinum, and beta tantalum or metal films whose major component is any one of metal nitride compounds such as tantalum nitride, molybdenum nitride, tungsten nitride, and titanium nitride, or any one of metal silicide compounds such as tungsten silicide, molybdenum silicide, cobalt silicide, and nickel silicide, or polysilicon, or silicon doped with phosphor or boron.

3. The thermal type fluid flow sensor according to claim 1, wherein the first heat generating resistor and the second heat generating resistor are formed by a metal film in a same layer.

4. The thermal type fluid flow sensor according to claim 1, wherein upper and lower sides of the first heat generating resistor, the second heat generating resistor, and the temperature measuring resistor are covered with insulating films.

5. The thermal type fluid flow sensor according to claim 4, wherein the insulating films on the upper and lower sides of the first heat generating resistor, the second heat generating resistor, and the temperature measuring resistor are constituted by silicon oxide films, silicon nitride films or aluminum nitride films or laminated films of these.

6. The thermal type fluid flow sensor according to claim 1, wherein the holes are formed so as not to planely overlap the first heat generating resistor.

7. The thermal type fluid flow sensor according to claim 1, wherein a diameter of the hole is equal to or less than 2 μm.

8. The thermal type fluid flow sensor according to claim 1, wherein the first heat generating resistor is extended in the same direction as a direction of extending an air path installed with the thermal fluid flow sensor above the substrate.

9. The thermal type fluid flow sensor according to claim 1, wherein a wiring width of the first heat generating resistor is equal to or less than 10 μm.

10. The thermal type fluid flow sensor according to claim 1, wherein the air cavity layer provided above the first heat generating resistor has a width wider than a wiring width of the first heat generating resistor in a direction orthogonally intersecting with a longitudinal direction of the first heat generating resistor in a planar shape thereof.

11. The thermal type fluid flow sensor according to claim 1, wherein the first film is made of a material whose heat transfer is lower than that of a material of the first heat generating resistor.

12. The thermal type fluid flow sensor according to claim 1, wherein the first film includes a polyimide film or a silicon nitride film.

13. The thermal type fluid flow sensor according to claim 1, wherein the first heat generating resistor, the second heat generating resistor, and the plurality of temperature measuring resistors are provided in a first diaphragm formed by removing the substrate of a lower layer.

14. The thermal type fluid flow sensor according to claim 1, wherein the second heat generating resistor and the temperature measuring resistors are provided in a first diaphragm formed by removing the substrate of a lower layer, the first heat generating resistor is provided in a second diaphragm formed by removing part of the substrate of a lower layer, and the second diaphragm is smaller than the first diaphragm in a planar shape.

15. The thermal type fluid flow sensor according to claim 1, wherein a wiring and an electrode electrically connected to the first heat generating resistor are not electrically connected to a wiring and an electrode connected to the second heat generating resistor above the substrate.

* * * * *